(12) United States Patent
Massicot et al.

(10) Patent No.: US 12,463,824 B2
(45) Date of Patent: Nov. 4, 2025

(54) METHOD AND DEVICE FOR SECURING AN OBJECT AND METHOD FOR AUTHENTICATING AN OBJECT

(71) Applicant: ADVANCED TRACK & TRACE, Rueil-Malmaison (FR)

(72) Inventors: Jean-Pierre Massicot, Rueil-Malmaison (FR); Zbigniew Sagan, Rueil-Malmaison (FR)

(*) Notice: Subject to any disclaimer, the term of this patent is extended or adjusted under 35 U.S.C. 154(b) by 145 days.

(21) Appl. No.: 18/251,247

(22) PCT Filed: Nov. 30, 2020

(86) PCT No.: PCT/EP2020/083984
§ 371 (c)(1),
(2) Date: May 1, 2023

(87) PCT Pub. No.: WO2021/105514
PCT Pub. Date: Jun. 3, 2021

(65) Prior Publication Data
US 2024/0129131 A1   Apr. 18, 2024

(51) Int. Cl.
*H04L 9/32* (2006.01)
*G06K 19/06* (2006.01)
*G06T 1/00* (2006.01)

(52) U.S. Cl.
CPC ...... *H04L 9/3247* (2013.01); *G06K 19/06037* (2013.01); *G06T 1/0042* (2013.01); *G06T 2201/0064* (2013.01); *G06T 2201/0065* (2013.01)

(58) Field of Classification Search
CPC ............ H04L 9/3247; G06K 19/06037; G06T 1/0042; G06T 2201/0064; G06T 2201/0065; G06T 2201/0051; G06T 1/0028; H04N 1/32331
See application file for complete search history.

(56) References Cited

U.S. PATENT DOCUMENTS

| | | | |
|---|---|---|---|
| 9,749,317 B2* | 8/2017 | Cartaya | H04L 63/0861 |
| 2009/0302123 A1* | 12/2009 | Lugt | G06K 19/06037 235/494 |
| 2015/0088674 A1* | 3/2015 | Flurscheim | G06Q 20/326 705/17 |
| 2016/0212126 A1* | 7/2016 | Sadacharam | H04W 12/06 |
| 2016/0239655 A1* | 8/2016 | Sadacharam | G06F 21/42 |

(Continued)

FOREIGN PATENT DOCUMENTS

| | | | | |
|---|---|---|---|---|
| CN | 115688828 A | * | 2/2023 | G06K 7/14 |
| EP | 2541454 A2 | * | 1/2013 | G06F 21/335 |

(Continued)

*Primary Examiner* — Christopher A Revak
(74) *Attorney, Agent, or Firm* — Patshegen IP; Moshe Pinchas

(57) ABSTRACT

The method (100) for securing an object comprises:
  a step of encoding a first message (301) in a two-dimensional barcode (303), the first message comprising at least a header identifying a certification resource and a signature produced by means of this resource;
  a step of generating a fragile anti-copy mark (304) encoding a second message (302) representative of the signature produced, the second message comprising redundancies; and
  a step of marking the object with the first 2D barcode and the fragile anti-copy mark.

20 Claims, 6 Drawing Sheets

(56) References Cited

U.S. PATENT DOCUMENTS

| | | | | |
|---|---|---|---|---|
| 2021/0312561 | A1* | 10/2021 | Speasl | G06F 21/602 |
| 2023/0034244 | A1* | 2/2023 | Massicot | G06K 19/06037 |
| 2023/0143357 | A1* | 5/2023 | Sanderson | G06Q 20/204 |
| | | | | 235/494 |

FOREIGN PATENT DOCUMENTS

| | | | | | |
|---|---|---|---|---|---|
| EP | | 4345683 A1 * | 4/2024 | | B42D 25/305 |
| WO | WO-2019076822 A1 * | | 4/2019 | | G06V 20/95 |
| WO | WO-2019095172 A1 * | | 5/2019 | | G06K 19/06 |
| WO | WO-2021024023 A1 * | | 2/2021 | | G06F 21/30 |

\* cited by examiner

METHOD AND DEVICE FOR SECURING AN OBJECT AND METHOD FOR AUTHENTICATING AN OBJECT

TECHNICAL FIELD OF THE INVENTION

The present invention relates to a method and device for securing an object, a method and a device for authenticating an object, and a document secured by a method that is the subject of the present invention. It applies, in particular, to the field of cryptography, verification of the integrity of data and the detection of copies.

STATE OF THE ART

Currently, the certification authorities issue certificates describing digital identities and make available the means for verifying the validity of certificates that it has provided for a validity period of three, five or sometimes ten years, depending on uses. Once the certificate has expired, it can no longer be accessed. These certificates are used, among others, to sign characteristic data concerning objects or physical documents.

However, in the context of objects and documents with a long life cycle such as, for example, objects of value and diplomas, the certificate may have expired, which makes the marks bearing affixed signed characteristic data unverifiable.

Given the large number of objects or documents marked and signed each year, it would be very costly to store all the certificates even after their expiry in databases whose storage capacity would be extremely large. Moreover, if a single certificate is used, in the context of a specific use, for several million or several billion objects, it would be complicated and very costly to keep all the signed references in a database of the certification body.

In addition, the visible electronic stamps (acronym "VES") are defined by standards, their size of functional modules in bytes is standardised and, in most cases, cannot be less than 64 bytes (16 bytes for the header, zero or at least one bit for the message and 48 for the signature).

The visible electronic stamps are encoded in 2D (or "two-dimensional") barcodes, preferably codes such as Data Matrix or QR (registered trademark, acronym for "Quick Response") codes. However, depending on the location on which the 2D barcode must be positioned, the size of the code must be minimised, but always readable by a reader.

It is therefore not always possible to place the entire visible electronic stamp in the 2D barcode within the limits of the surface area available.

DESCRIPTION OF THE INVENTION

The present invention aims to remedy all or part of these drawbacks.

To this end, according to a first aspect, the present invention envisions a method for securing an object, which method comprises:
- a step of encoding a first message in a 2D barcode, the first message comprising at least a header identifying a certification resource and a signature produced by means of this resource;
- a step of generating a fragile anti-copy mark encoding a second message representative of the signature produced, the second message comprising redundancies; and
- a step of marking the object with the first 2D barcode and the fragile anti-copy mark.

Thanks to these provisions, the fragile anti-copy mark makes it possible to verify that the signature, at the time of affixing the mark and the 2D barcode, was indeed authentic and corresponded to a certificate, even if this certificate is no longer accessible. It is therefore possible not only to verify the integrity of the data even after the expiry of the certificate giving rise to the signature but also to verify the physical legitimacy of the object that bears these data. The fragile anti-copy mark acts as a trusted third party.

In some embodiments, the second message encoded in the fragile anti-copy mark comprises at least one item of information representative of the object on which the mark is to be affixed. These embodiments make it possible in particular to link the fragile anti-copy mark to the object on which it is affixed. In this way, the user can verify that the mark read does correspond to the single object on which it was affixed originally, as well as verifying the integrity of the data it bears.

In some embodiments, the method that is the subject of the invention also comprises a step of determining at least one physical property of the object on which the fragile anti-copy mark is to be affixed, the second message encoded in the fragile anti-copy mark comprising an item of information representative of the physical property determined. The advantage of these embodiments is to identify an object in relation to its physical characteristics. More specifically, when the object is produced in series, it is possible to identify differentiating physical characteristics, for example at microscopic level, in the very structure of the object.

In some embodiments, an item of information representative of the object on which the mark is to be affixed is a metric artefact or a physical unclonable function (acronym "PUF"). These embodiments make it possible to identify each object by information specific to it, similar to biometric information for living beings.

In some embodiments, the second message representative of the signature produced is obtained by at least applying a hash function for the signature produced. These embodiments make it possible to limit the amount of data to be stored in the fragile anti-copy mark while securely verifying the hash and its signature.

In some embodiments, the second message representative of the signature produced is obtained by calculating a cyclic redundancy code (acronym "CRC") applied to the hash resulting from the hash function of the signature produced. These embodiments make it possible to limit the amount of data to be stored in the fragile anti-copy mark while implicitly securely verifying the hash and its signature.

In some embodiments, the 2D barcode is representative of a visible electronic stamp. Thanks to these provisions, the size and content of the header and signature are standardised.

According to a second aspect and/or in some embodiments detailed above, the present invention envisions a method for securing an object, which comprises:
- a step of constituting a content of a visible electronic stamp representative of at least a header, a message and a signature;
- a step of determining a shape of a 2D barcode having an information storage capacity spread over at least two areas;
- a step of segmenting the content of the visible electronic stamp into at least two portions according to the storage capacity of each area, each portion being assigned to an area;

a step of recording an item of information representative of the segmentation and assignment in order to reconstruct, on reading, the content of the visible electronic stamp;

a step of encoding the segmented visible electronic stamp in the shape of the 2D barcode determined; and a step of marking the object with the encoded 2D barcode.

Thanks to these provisions, the visible electronic stamp is spread over the entire 2D barcode without the constituent elements of the code being placed in order. The structure of the VES is then reconstituted when the code is read. 2D barcodes constrained to have small dimensions are therefore readable while containing all of the VES data.

In some embodiments, the 2D barcode is a code comprising at least one orientation element for reading the code and a payload space, at least one orientation element for reading the code being a storage area and the payload space being another storage area.

These embodiments make it possible to have information carried by elements of the 2D barcode that do not usually carry it.

In some embodiments, the header of the visible electronic stamp comprises an item of information representative of the segmentation and assignment.

The advantage of these embodiments is that the header of the stamp can give access to a local or remote resource comprising the information needed to reconstitute the message, for limiting the size of the VES.

In some embodiments, the method that is the subject of the invention comprises:

a step of creating a fragile anti-copy mark representative of the segmentation and assignment in order to reconstruct the electronic stamp; and a step of marking the fragile anti-copy mark on the object.

These embodiments make it possible to store the rules for reconstructing the VES in a separate mark. It is therefore possible to perform a first verification of the integrity of the objects and data. In particular, if the reconstructed code does not correspond to the correct code structure, the authenticity of the object is compromised.

In some embodiments, the method that is the subject of the invention also comprises:

a step of determining a cell size of the 2D barcode, the cell size being defined by a surface containing a quantity of dots;

a step of estimating a minimum quantity of dots of a predefined colour in a cell such that the cell is detected as having this colour by a predefined reader; and for at least one cell, a step of defining an image to be represented in this cell, the quantity of dots of the image having the colour defining the cell being greater than the estimated minimum quantity, a set of images representing the header, message and/or signature.

Thanks to these provisions, the signature of the VES may not be contained or at least entirely contained in the 2D barcode but represented in the cells, which allows a necessary saving of space in the 2D barcode.

In some embodiments, at least one portion of the 2D barcode is a high-density 2D barcode.

These embodiments make it possible to increase the storage capacity of the 2D barcode without modifying its dimensions.

In some embodiments, at least one portion of the orientation element for reading the code is a high-density 2D barcode.

Thanks to these provisions, the storage capacity of the QR code or Data Matrix code is increased without affected this code's ability to be read by a reader.

According to a third aspect, the present invention envisions a device for securing an object, which device comprises:

a means for encoding a first message in a 2D barcode, the first message comprising at least a header identifying a certification resource and a signature produced by means of this resource;

a means for generating a fragile anti-copy mark encoding a second message representative of the signature produced, the second message comprising redundancies; and a means for marking the object with the first 2D barcode and the fragile anti-copy mark.

As the particular aims, advantages and features of the securing device that is the subject of the invention are similar to those of the securing method that is the subject of the invention, they are not repeated here.

According to a fourth aspect, the present invention envisions a method for authenticating an object, which method comprises:

a step of reading a 2D barcode to obtain a first message comprising a header identifying a certification resource and a signature produced by means of this resource;

a step of calculating an element representative of the hash of the signature produced and/or of the signature produced;

a step of reading a fragile anti-copy mark to obtain a second message representative of the signature produced, the second message comprising redundancies;

a first step of comparing the representative element read with the representative element calculated; and a step of indicating the authenticity of the object on the basis of the result of at least one comparison.

Thanks to these provisions, the user can rapidly have information concerning the authenticity or otherwise of the object marked even if the certificate has expired.

In some embodiments, during the step of reading a fragile anti-copy mark, an item of information is obtained representative of the object on which the mark has been affixed, the method also comprising a second step of comparing the information obtained and the object. These embodiments make it possible to verify that the fragile anti-copy mark and the 2D barcode have not been moved from one object to another and that it is indeed the original object whose authenticity is verified.

According to a fifth aspect, the present invention envisions a device for authenticating an object, which device comprises:

a means for constituting a content of a visible electronic stamp representative of at least a header, a message and a signature;

a means for determining a shape of a 2D barcode having an information storage capacity spread over at least two areas;

a means for segmenting the content of the visible electronic stamp into at least two portions according to the storage capacity of each area, each portion being assigned to an area;

a step of recording an item of information representative of the segmentation and assignment in order to reconstruct, on reading, the content of the visible electronic stamp;

a means for encoding the segmented visible electronic stamp in the shape of the 2D barcode determined; and a means for marking the object with the encoded 2D barcode.

As the particular aims, advantages and features of the securing device that is the subject of the invention are similar to those of the securing method that is the subject of the invention, they are not repeated here.

According to a sixth aspect, the present invention envisions a method for authenticating an object, which method comprises:
- a step of reading a 2D barcode obtained according to the securing method that is the subject of the invention;
- a step of accessing an item of information representative of a segmentation of the first message and an assignment of segments of the first message to areas of the 2D barcode, in order to reconstruct a content of a visible electronic stamp;
- a step of reconstituting the content of the visible electronic stamp according to the information of the segmentation and assignment accessed; and
- a step of verifying the authenticity of the content of the reconstituted visible electronic stamp.

Thanks to these provisions, the authenticity of the VES can be verified, if the reconstitution corresponds to the structure of a VES, even if the code is spread over several elements of the 2D barcode.

According to a seventh aspect, the present invention envisions a device for authenticating an object, which device comprises:
- a means for reading a 2D barcode obtained according to the securing method that is the subject of the invention;
- a means for accessing an item of information representative of a segmentation of the first message and an assignment of segments of the first message to areas of the 2D barcode, in order to reconstruct a content of a visible electronic stamp;
- a means for reconstituting the content of the visible electronic stamp according to the segmentation and assignment; and
- a means for verifying the authenticity of the reconstituted visible electronic stamp.

As the particular aims, advantages and features of the authentication method that is the subject of the invention are similar to those of the authentication device that is the subject of the invention, they are not repeated here.

The different aspects of the invention and their characteristics are intended to be combined with each other such that a marking of an object enables the authentication of this object.

BRIEF DESCRIPTION OF THE FIGURES

Other advantages, aims and particular features of the invention will become apparent from the non-limiting description that follows of at least one particular embodiment of the securing method and device and the authentication method and device that are the subjects of the present invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way. Note that the figures are not to scale. The following terms have the following definitions:

Object: Any concrete item, perceptible to the eye, through touch, e.g. an electronic chip or a document, on which an item of information is marked.

Dot: the smallest element of a physical object marked, from one or more pixels.

Cell: a set of dots being defined by a surface containing a quantity of dots, the shape of a cell can be any known shape, e.g. a square, a rectangle or a circle.

Two-dimensional (2D) barcode: a two-dimensional graphic code comprising cells, e.g. square, each cell having at least one colour among two distinct colours, examples of 2D barcodes are QR (registered trademark, acronym for "Quick Response") codes, Data Matrix codes, Semacodes (registered trademark).

Marking: the affixing of a graphic element from a digital information source on an object, for example by engraving or printing.

Fragile anti-copy mark: a mark whose degradation by the noise during marking, i.e. the generation of individually unpredictable ad-hoc errors, leading to a dot being interpreted with an incorrect value, and then copying, can be measured to distinguish an original from a copy.

Visible electronic stamp (acronym "VES"): set of data structured in the form of a machine-readable code containing a header, a message and their signature by the issuer. The header determines the type of message and the issuer. The header references a signature certificate. An optional block of ancillary data can be added after the signature.

Signature: a certificate indicates the digital signature algorithm used and incidentally the size of the signature, which is usually based on the intended lifespan of the signature. The signature is used to verify the integrity of the data signed, and to identify/authenticate the issuer of the object. In the context of a VES, the certificate is referenced in the header and the signature calculated using the private key makes it possible to verify the integrity of the header and message.

In the remainder of the description, the cells and the 2D barcodes have a square shape by way of illustration. The person skilled in the art will be able to use cells and 2D barcodes with different shapes.

Figure 1:
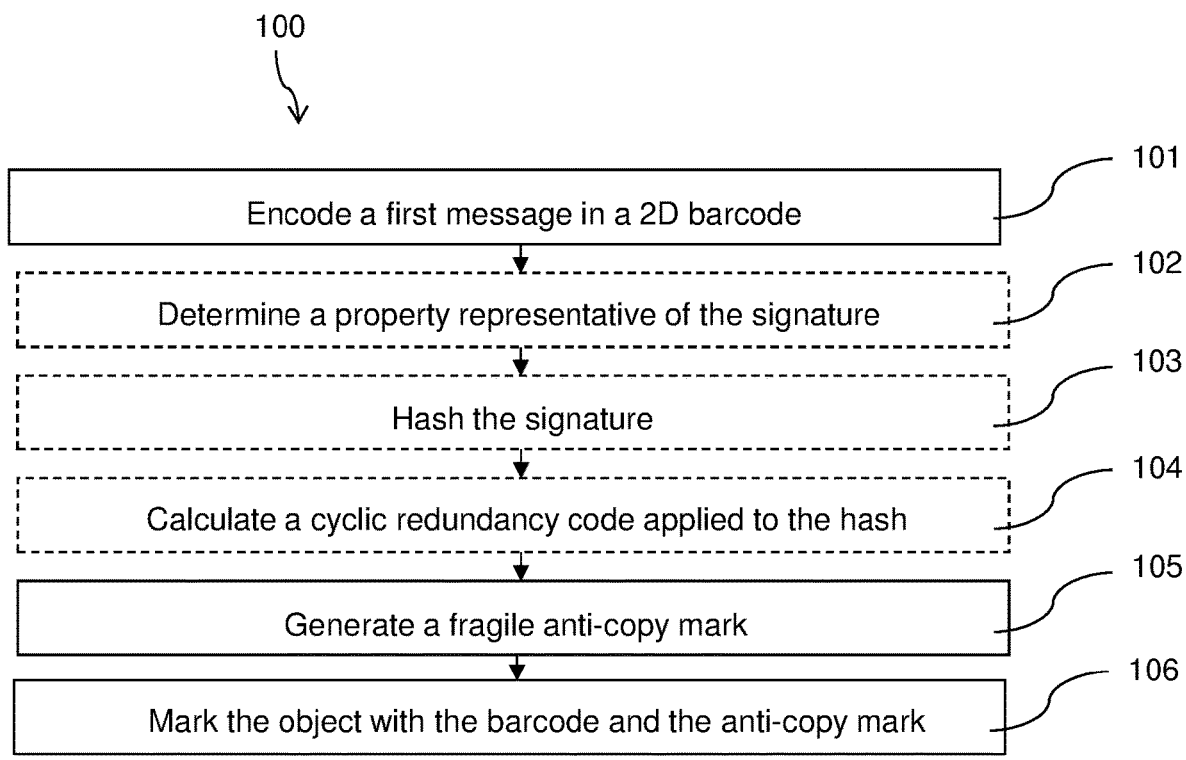
FIG. 1 represents, schematically and in the form of a logical diagram, a particular series of steps of the securing method that is the subject of the invention.

FIG. 1, which is not to scale, shows a schematic view of an embodiment of the method 100 that is the subject of an aspect of the invention.

The method 100 for securing an object comprises:
- a step 101 of encoding a first message in a 2D barcode, the first message comprising at least a header identifying a certification resource and a signature produced by means of this resource;
- a step 105 of generating a fragile anti-copy mark encoding a second message representative of the signature produced, the second message comprising redundancies; and
- a step 106 of marking the object with the first 2D barcode and the fragile anti-copy mark.

The encoding step 101 can be carried out by means known to the person skilled in the art, for example by means of a symmetric key or an asymmetric key, scrambling and permutations, in a way known to the person skilled in the art. The first encoded message is preferably a visible electronic stamp. The 2D barcode can be any barcode known to the person skilled in the art, for example a QR (registered trademark, acronym for "Quick Response") code or a Data Matrix code.

In some embodiments, during the encoding step, alphanumeric characters are represented in the cells of the 2D barcode without changing the colour detected by a reader of the 2D barcode. That is to say that a minimum quantity of dots of a predefined colour in a cell, such that the cell is detected as having this colour by a predefined reader, is complied with during the representation of the alphanumeric character.

In cryptography, the hash, with synonyms "digest" and "fingerprint", is the result of applying a hash function to a message.

During the generation step 105, the code generated comprises redundancies configured such that the second message is readable and/or it can be reconstituted, despite the degradations of the fragile anti-copy mark due to printing. Therefore, the anti-copy mark is indeed fragile but the second message can be considered robust, i.e. its content can be accessed. Redundancies are well known to the person skilled in the art, either for detecting errors in a signal or a message, for example with a parity bit or error detection codes, or for correcting errors with error correction codes. These redundancies can be, in particular, at least one additional reproduction of the signal or message, or a CRC (cyclic redundancy code or check).

The CRC is a software tool making it possible to detect transmission or transfer errors by the addition, combination and comparison of redundant data, for example obtained through a hash procedure. In this way, an error can be reported to the user during copying from one medium (hard disk, CD-ROM, DVD-ROM, USB key, etc.) to another backup medium. The CRCs are evaluated (sampled) before and after the transmission or transfer, and then compared to make sure that the data are identical. The CRC calculations used most are designed to be able to always detect, even correct, errors of certain types, such as those due, for example, to interference during the transmission. With regard to the implementation, the essential mathematical operation in the calculation of some CRCs is a modulo 2 division whose remainder represents the CRC. With regard to the anti-copy mark, this is a question of correcting the errors linked to the analog production or reproduction of the fragile anti-copy mark, which makes it possible to, simultaneously, measure its error rate and therefore to detect a copy, and to access the second message contained in this fragile code.

In some embodiments, the second message encoded in the fragile anti-copy mark comprises at least one item of information representative of the object on which the mark is to be affixed, for example an item of information representative of at least one physical characteristic of the object. The information representative of the object can be any information relating to the production and/or distribution of the product. For example, an identification of the manufacturer, a serial number, or an identification of authorised distributors.

Preferably, the method 100 also comprises a step 102 of determining at least one physical property of the object on which the fragile anti-copy mark is to be affixed, the second message encoded in the fragile anti-copy mark comprising an item of information representative of the physical property determined.

During the determination step 102, at least one photograph of the object is captured, and then characteristic elements are extracted from this photograph, for example edges, changes of contrast, colours, characters recognised by optical character recognition. The characteristic elements are then directly encoded in the anti-copy mark. The photograph, or a means for accessing it, can also be encoded in the fragile anti-copy mark.

In some embodiments, an item of information representative of the object on which the mark is to be affixed is a metric artefact or a physical unclonable function (acronym "PUF").

A metric artefact is a unique fingerprint corresponding to the object. The metric artefacts are calculated based on marks of shapes individual to each object during the production of the object. It involves, to some extent, fingerprints of the object. The metric artefacts can be calculated from an image of the object.

A physical unclonable function is comparable to a fingerprint for physically defining a semiconductor device such as a microprocessor. The physical unclonable function is based on unique physical variations that occur naturally during the manufacture of semiconductors. A physical unclonable function is a physical entity incorporated into a physical structure. Currently, physical unclonable functions are generally utilised in integrated circuits. Preferably, the second message comprises a location of at least one portion of the object from which the metric artefact was calculated.

In some embodiments, the second message representative of the signature produced is obtained at least by applying a hash function 103 for the signature produced. Therefore, it is not necessary to decode the signature to verify the match between the signature of the first message and the characteristic element encoded in the second message.

In some embodiments, the second message representative of the signature produced is obtained by the calculation 104 of a cyclic redundancy code (acronym "CRC") applied to the hash resulting from the hash function 103 of the signature produced. The calculation of the cyclic redundancy code makes it possible to detect the errors by the addition, combination and comparison of redundant data, for example obtained through a hash procedure.

The CRCs are evaluated or sampled based on the hash of the signature of the first message and on the encoded hash of the second message, then compared to make sure that the data are probably identical. The comparison is therefore carried out implicitly.

The 2D barcode and the fragile anti-copy mark are then marked 106 on the object. The marking step 106 is carried out by any means known to the person skilled in the art, for example a printer or a laser for engraving the object.

Figure 2:
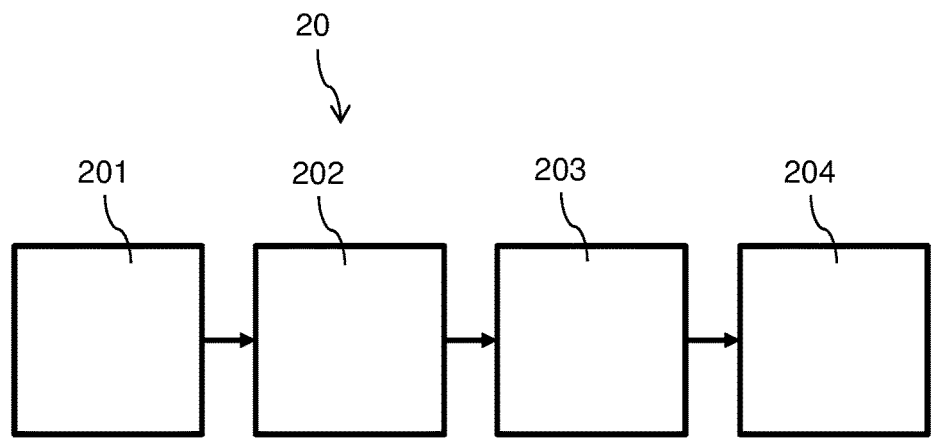
FIG. 2 represents, schematically, a first particular embodiment of a securing device that is the subject of the invention.

FIG. 2 represents a first particular embodiment of a securing device 20 that is the subject of an aspect of the invention.

The device for securing an object comprises:
- a means 201 for encoding a first message in a 2D barcode, the first message comprising at least a header identifying a certification resource and a signature produced by means of this resource;
- a means 203 for generating a fragile anti-copy mark encoding a second message representative of the signature produced, the second message comprising redundancies; and
- a means 204 for marking the object with the first 2D barcode and the fragile anti-copy mark.

In some preferred embodiments, the device 20 comprises a means for determining at least one physical property of the object on which the fragile anti-copy mark is to be affixed, the second message encoded in the fragile anti-copy mark comprising an item of information representative of the physical property determined.

Preferably, the embodiments of the device 20 are configured to implement the steps of the method 100 and their embodiments as described above, and the method 100 and its different embodiments can be implemented by the embodiments of the device 20.

The means for encoding 201, determination 202 and generation 203 are preferably a microcontroller implementing a computer program.

The marking means 204 can be any means known to the person skilled in the art, such as a printer or a laser for engraving the object.

Figure 3:
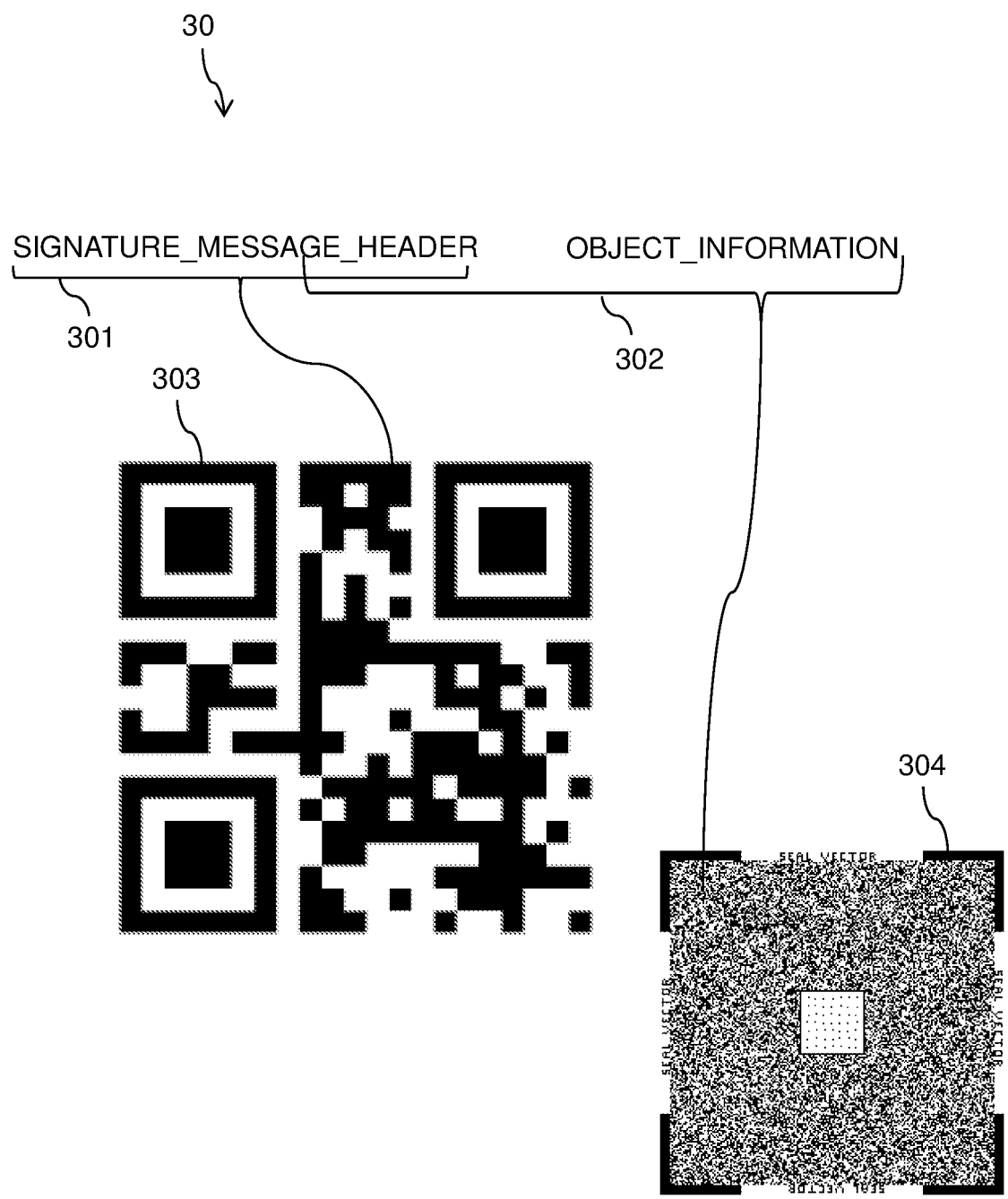
FIG. 3 represents, schematically, a first embodiment of an object secured by a method that is the subject of the present invention.

FIG. 3 shows a particular embodiment of a fragile anti-copy mark and a 2D barcode obtained by a method that is the subject of an aspect of the invention.

A first message 301 comprising a header, a message and a signature is represented. The first message 301 is encoded in a 2D barcode 303. In FIG. 3, the 2D barcode 303 is a QR code comprising three blocks orienting the reading of the code and a payload in which the first message is encoded. The first message is encoded in the form of black or white cells.

FIG. 3 also shows a second message 302 comprising an element representative of the signature of the first message 301 and an item of information representative of the object, for example a physical characteristic of the object.

The second message is encoded in a SealVector 304 (registered trademark). A SealVector is a fragile anti-copy mark, in the form of a 2D barcode in which a second message can be encoded in a secure way. In the representation in FIG. 3, the fragile anti-copy mark 304 has black and white cells encoding the second message 302.

The fragile anti-copy mark 304 and the 2D barcode 303 are therefore linked by their content, the fragile anti-copy mark 304 allowing the authenticity of the 2D bar code 303 to be verified. And the fragile anti-copy mark 304 and the object (not shown) are also linked, the fragile anti-copy mark 304 making it possible to verify that the 2D barcode 303 has been applied to the right object. Lastly, by its nature, the original nature or otherwise of the fragile anti-copy mark can be verified. The object therefore has three levels of protection.

Figure 4:
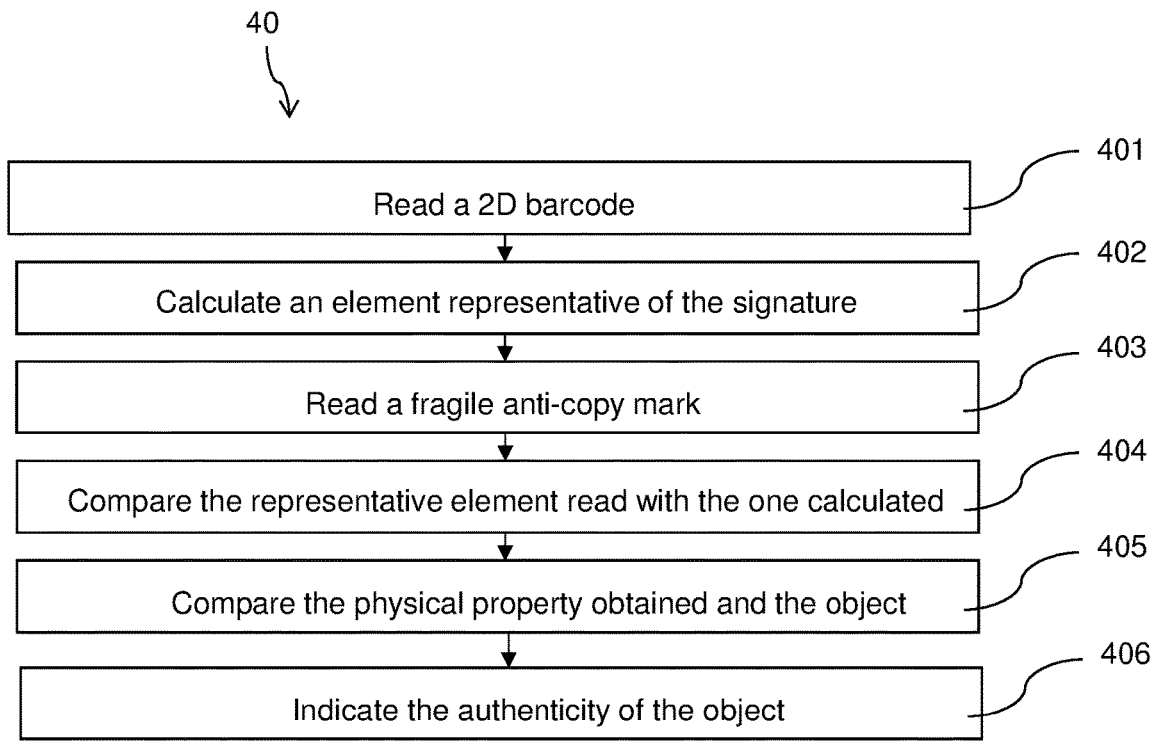
FIG. 4 represents, schematically and in the form of a logical diagram, a particular series of steps of the authentication method that is the subject of the invention.

FIG. 4 shows a suite of particular steps representing the method 40 for authenticating an object, the subject of an aspect of the invention.

The method 40 for authenticating an object comprises:
- a step 401 of reading a 2D barcode to obtain a header identifying a certification resource and a signature produced by means of this resource;
- a step 402 of calculating an element representative of the hash of the signature produced and/or of the signature produced;
- a step 403 of reading a fragile anti-copy mark to obtain a second message representative of the signature produced, the second message comprising redundancies;
- a first step 404 of comparing the representative element read with the representative element calculated; and
- a step 406 of indicating the authenticity of the object on the basis of the result of at least one comparison.

During the reading step 401, the 2D barcode is decoded by a reader 501. The reader 501 is, for example, a communicating mobile terminal 506 equipped with a photo camera or camera that scans the code. The communicating mobile terminal then applies an algorithm for decoding the code.

The certification resource is, for example, an access to a remote server or to a website referencing an electronic certificate, and preferably a manifest explaining the extraction and verification of the references.

During the calculation step 402, a hash of the signature, and preferably a CRC of the hash (or digest) and its signature are calculated, the signature having been read during the reading step 401.

In some embodiments, alphanumeric characters are represented in the cells of the 2D barcode without changing the colour detected by a reader of the 2D barcode. That is to say that a minimum quantity of dots of a predefined colour in a cell, such that the cell is detected as having this colour by a predefined reader, is complied with during the representation of the alphanumeric character.

Preferably, the alphanumeric characters represent the signature and can be read through optical character recognition.

The step 403 of reading the fragile anti-copy mark can be carried out by the same reader as the reader carrying out the reading of the 2D barcode. During the reading step 403, the original or copied nature of the fragile anti-copy mark is evaluated. The evaluation of the original or copied nature depends on an error rate detected during the reading of the fragile anti-copy mark. The error rate is compared against a predefined limit value that makes it possible to determine whether the fragile anti-copy mark is an original or not.

In effect, the fragile anti-copy mark has, as soon as it is first printed on the document, a large quantity of random errors that cause a copy, made with the same printing means as the original document, of the printed identification image to comprise even more errors, the total number of errors of the copy making it possible to detect that it is a copy. The redundancies present in the identification image make it possible to correct printing and/or reading defects and the wear or erasure marks of the fragile anti-copy mark.

The copied nature of the fragile anti-copy mark is a first indication level of the authenticity of the object. During the step of indicating the authenticity of the object 406, the copied nature of the fragile anti-copy mark is preferably reported to a user.

During the step 404 of comparing the representative element read with the representative element calculated, the elements are preferably compared character by character. In other embodiments, a calculation of similarity between the elements read and calculated is carried out. If the similarity calculated is greater than a predefined limit value, the elements are considered to be sufficiently close, and the object is considered to be authentic.

Preferably, during the step 403 of reading a fragile anti-copy mark, an item of information is obtained representative of the object on which the mark has been affixed, the method also comprising a second step 405 of comparing the representative information obtained and the object.

The representative information can be a serial number, for example. The serial number of the object can be obtained through optical character recognition. In these cases, the comparison step can be carried out by character-by-character comparison.

In some embodiments, the representative information can be a physical property or a metric artefact. In these embodiments, an image of the object can be taken, during the authentication, and a calculation of similarity with an image or a metric encoded by means of the fragile anti-copy mark is then carried out. When the similarity is greater than a predefined limit value, the fragile anti-copy mark is considered to have been affixed on this object. This finding is indicated to the user during the step 406.

During the indication step 406, the indication can be visual, on a screen of the terminal 506, or audible, on an electroacoustic transponder of the terminal 506.

Figure 5:
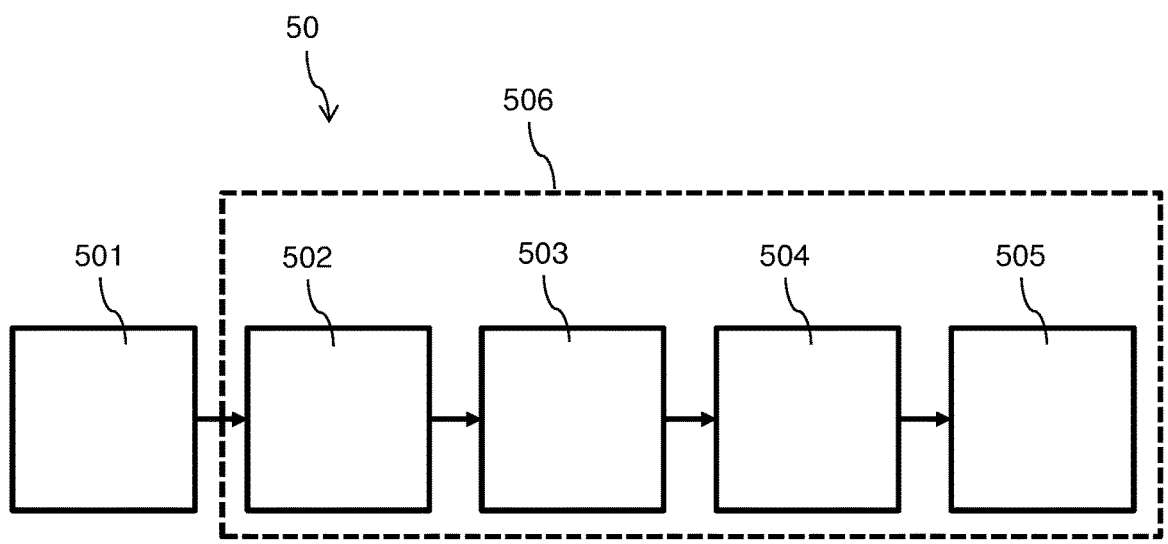
FIG. 5 represents, schematically, a first particular embodiment of an authentication device that is the subject of the invention.

FIG. 5 shows a particular embodiment of a device 50 for authenticating an object, the subject of an aspect of the invention, which device comprises:

- a means 501 for reading a 2D barcode to obtain a header identifying a certification resource and a signature produced by means of this resource;
- a means 502 for calculating an element representative of the hash of the signature produced and/or of the signature produced;
- a means 501 for reading a fragile anti-copy mark to obtain a second message representative of the signature produced, the second message comprising redundancies;
- a means 504 for comparing the representative element read with the representative element calculated; and
- a means 505 for indicating the authenticity of the object on the basis of the result of at least one comparison.

In some embodiments, the means 501 for reading a fragile anti-copy mark obtains a physical property of the object on which the mark has been affixed, the device 50 also comprising a second means 503 for comparing the physical property obtained and the object.

Preferably, the means of the device 50 are configured to implement the steps of the method 40 and their embodiments as described above, and the method 40 and its different embodiments can be implemented by the means of the device 50.

The means for calculation 502, comparison 503 and comparison 504 are preferably a microcontroller implementing a computer program.

The reading means 501 can be any means known to the person skilled in the art, such as a communicating mobile terminal 506 equipped with a photo camera or camera that scans the code. The communicating mobile terminal then applies an algorithm for decoding the code.

The indication means 505 can be any means known to the person skilled in the art, for example a display screen of a terminal 506.

Figure 6:
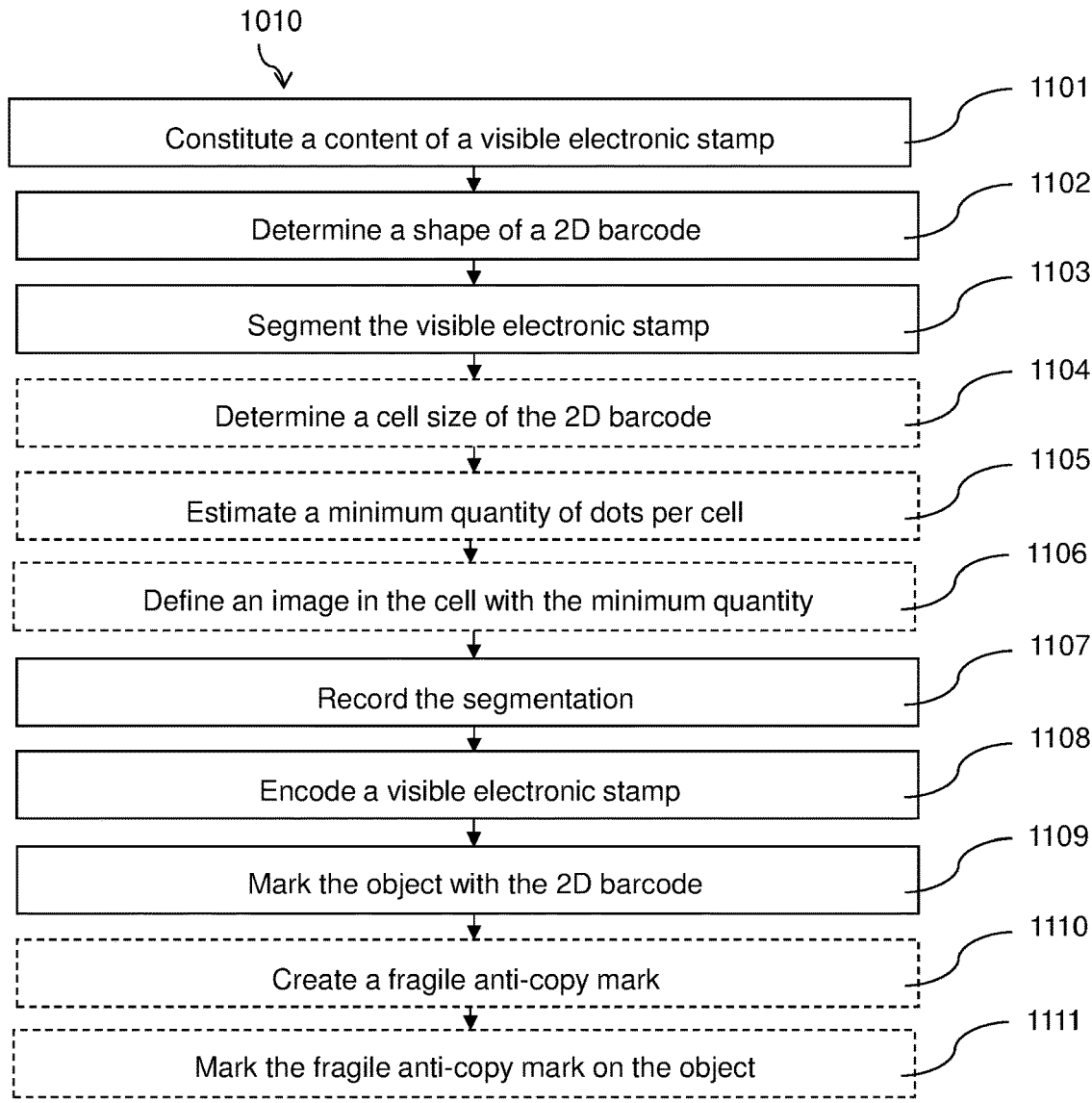
FIG. 6 represents, schematically and in the form of a logical diagram, a particular series of steps of the securing method that is the subject of the invention.

FIG. 6 shows a suite of particular steps of an embodiment of the method 1010 for securing an object, the subject of an aspect of the invention. The steps in dotted lines are optional.

The first message is a content of a visible electronic stamp representative of at least a header, a message and a signature, and the method 1010 comprises:

- a step 1102 of determining a shape of the first 2D barcode having an information storage capacity spread over at least two areas;
- a step 1103 of segmenting the content of the visible electronic stamp into at least two portions according to the storage capacity of each area, each portion being assigned to an area;
- a step 1107 of recording an item of information representative of the segmentation and assignment in order to reconstruct, on reading, the content of the visible electronic stamp;
- a step 1108 of encoding the segmented visible electronic stamp in the shape of the 2D barcode determined; and
- a step 1109 of marking the object with the encoded 2D barcode.

During the step 101 of constituting a visible electronic stamp, the content of the visible electronic stamp is constituted in accordance with the VES standard employed.

The content of the visible electronic stamp is designed to be encoded in a 2D barcode, also known as a "visible electronic stamp".

During the determination step 1102, the shape determined has:

- dimensions in a number of cells and/or in a number of dots and/or in dimensions of the system of metrics;
- an information storage capacity spread over at least two areas;
- optionally, graphic elements defined by a standard.

In some embodiments, the 2D barcode can be a QR (registered trademark, acronym for "Quick Response") code comprising at least one orientation element for reading the code and a payload space, at least one orientation element for reading the code being a storage area and the payload space being another storage area. An orientation element for reading the code is a black square, containing in its centre another black square on a white background. Of course, the colours of the orientation element can be adapted according to the colours utilised to represent the 2D barcode. The payload space is directly linked to the dimensions of the 2D barcode and cells comprising the code.

In some embodiments, the 2D barcode is a Data Matrix code (registered trademark) comprising at least one orientation element for reading the code and a payload space, at least one orientation element being a storage area and the payload space being another storage area. The orientation element comprises two adjacent borders with a single colour, e.g. black. For a rectangular or square Data Matrix code, the borders form a corner.

In some preferred embodiments, at least one portion of the 2D barcode is a high-density 2D barcode. For example, the 2D barcode can be a QR code whose centre is replaced by a Data Matrix code. The payload space will therefore be smaller, but a new storage area, the Data Matrix, is created with a larger storage capacity than the payload space removed. In another preferred example, the 2D barcode can be a QR code in which one orientation element for reading the code is replaced by a Data Matrix code. The storage space in the orientation element is therefore significantly increased.

In some preferred embodiments, the device 1010 comprises:
- a step 1104 of determining a cell size of the 2D barcode, the cell size being defined by a surface containing a quantity of dots;
- a step 1105 of estimating a minimum quantity of dots of a predefined colour in a cell such that the cell is detected as having this colour by a predefined reader; and
- for at least one cell, a step 1106 of defining an image to be represented in the cell, the quantity of dots of the image having the colour defining the cell being greater than the estimated minimum quantity, a set of images representing the header, message and/or signature.

These embodiments allow the content of cells to be used as a storage area.

The minimum and maximum dimensions of a 2D barcode are dependent on:
- the surface area allocated on the object for placing the 2D barcode, defining a maximum dimension of the 2D barcode; and
- the quantity of information to be encoded in the 2D barcode, influencing a minimum dimension of the 2D barcode.

The surface area allocated on the object is chosen by the operator affixing the 2D barcode on the object. This operator is the manufacturer of the object or its distributor, for example.

The number of colours in the 2D barcode can have an impact on the quantity of information it is possible to encode in a 2D barcode.

The 2D barcodes, to be able to be read by a predefined reader, must have cells whose minimum dimensions are specified in the various norms and standards defining these codes.

Therefore, based on the surface area allocated on the object and the quantity of information to be encoded, minimum dimensions of cells, and therefore the minimum and maximum dimensions of a 2D barcode can be determined.

In other words, the maximum dimension of the cells can be determined based on the dimensions of the 2D barcode (which is dependent on the surface area allocated) and the quantity of information to be encoded.

In addition, depending on the marking resolution, dimensions expressed in centimetres or millimetres, for example, are expressed as a number of dots, for example dots per inch (acronym "DPI").

During the determination step 104, the size of cells is calculated based on at least the marking resolution, the surface area allocated on the object and the quantity of information to be encoded.

Once the quantity of cells has been determined, the minimum quantity of dots of a predefined colour in a cell, such that the cell is detected as having this colour by a predefined reader, is estimated 105.

The predefined colour corresponds to one of the colours in a 2D barcode. Generally, the 2D barcodes have two colours, preferably black and white. In some embodiments, the 2D barcodes have three or more colours.

For the rest of the description, the general case of two colours, black and white, is chosen to illustrate the invention. The description that follows can, of course, be adapted to the case of at least three colours or of different colours.

As a minimum, so that a colour can be detected correctly by the reader, the cell must strictly comprise more than 50% of dots of that colour. For example, for a cell size of 10 dots by 10 dots, at least 51 dots must be black for the cell to be detected as being black.

However, it is known to the person skilled in the art that the marking step and the reading step cause random errors whose rate can be determined and predicted.

During the estimation step 105, the error rate on marking and reading, by the predefined reader, is calculated, measured or estimated. And the minimum quantity of dots of a predefined colour is estimated for predicting the error rate obtained.

Then, for at least one cell, the method 1010 comprises a step 106 of defining an image to be represented in the cell, the quantity of dots of the image having the colour defining the cell being greater than the estimated minimum quantity. During the definition step 106, the image can be selected from among a database of images respecting the constraint concerning the quantity of dots of the image of the colour defining the cell and the maximum number of colours of the 2D barcode.

Preferably, the image represents an alphanumeric character. For example, the dots of the colour whose quantity is greater than the estimated minimum quantity represent an alphanumeric character. For example, in a cell that has to be read as black, the black dots represent the alphanumeric character.

In other embodiments, the dots other than the dots of the colour whose quantity is greater than the estimated minimum quantity represent an alphanumeric character. For example, in a cell that has to be read as white, the black dots represent the alphanumeric character.

In some embodiments, a portion solely of the set of alphanumeric character can be represented in an image. That is to say that certain characters are considered as too close to another character to be represented. Examples of such characters are "O" and "Q", and "P" and "R". Just one of the two characters may be represented in a single 2D barcode. This information can be identified in a remote resource.

In some embodiments, the alphanumeric characters represented can be in uppercase or lowercase.

Preferably, the characters make reference to an element of the message, for example the signature.

During the determination step 1102, storage areas are determined, each having a storage capacity. According to the embodiments presented above, the storage areas can be, for example:
- a payload space of a 2D barcode;
- an orientation element of a 2D barcode;
- a Data Matrix code incorporated in a 2D barcode; or
- the cell content of a 2D barcode.

The method 1010 comprises a step 1103 of segmenting the content of the visible electronic stamp into at least two portions according to the storage capacity of each area, each portion being assigned to an area.

The segmentation 1103 is dependent on the storage capacity of each area. Preferably, each element among the header, the message, the signature or a secondary field of information is kept in one portion. In some embodiments, during the segmentation step 103, the area assigned to each portion of the content of the VES comprises sufficient capacity to store redundancies of the portion stored.

The segmentation 1103 of the content of the VES and the assignment of each portion to an area are recorded during the step 1107 of recording an item of information representative of the segmentation and assignment in order to reconstruct, on reading, the visible electronic stamp.

Preferably the header of the visible electronic stamp comprises an item of information representative of the segmentation and assignment. For example, the segmentation and assignment 103 are recorded on a remote or local resource referred to by the header, for example a website of the certification authority or manufacturer. Or the representative information can be a manifest whose location is obtained from information contained in the header.

In other embodiments, the method 1010 comprises:
- a step 1110 of creating a fragile anti-copy mark representative of the segmentation and assignment in order to reconstruct the electronic stamp; and
- a step 1111 of marking the fragile anti-copy mark on the object.

For example, the information representative of the segmentation and assignment is encoded in a fragile anti-copy mark. In these embodiments, the code generated comprises redundancies configured such that the information is readable and/or it can be reconstituted, despite the degradations of the fragile anti-copy mark due to printing. Therefore, the anti-copy mark is indeed fragile but the information can be considered robust, i.e. its content can be accessed even if the mark is copied.

In some embodiments, an element representative of the signature produced and redundancies are encoded in the fragile anti-copy mark. These embodiments allow the authenticity of the signature to be verified at the time of marking, even if the signature certificate is no longer accessible.

In some embodiments, a message encoded in the fragile anti-copy mark comprises at least one item of information representative of the object on which the mark is to be affixed. The information representative of the object can be any information relating to the production and/or distribution of the product. For example, an identification of the manufacturer, a serial number, or an identification of authorised distributors, a physical property extracted from a photograph of the object or a metric artefact.

A metric artefact is a unique fingerprint corresponding to the object. The metric artefacts are calculated based on marks of shapes individual to each object during the production of the object. It involves, to some extent, fingerprints of the object. The metric artefacts can be calculated from an image of the object, for example.

The step 1111 of marking the fragile anti-copy mark is carried out by any means known to the person skilled in the art, for example a printer or a laser for engraving the object.

The encoding step 1108 can be carried out by means known to the person skilled in the art, for example by means of a symmetric key or an asymmetric key, scrambling and permutations, in a way known to the person skilled in the art.

The 2D barcode is then marked 1109 on the object. The marking step 1109 is carried out by any means known to the person skilled in the art, for example a printer or a laser for engraving the object. Preferably, the step 1111 of marking the fragile anti-copy mark on the object is carried out at the same time as the step 1109 of marking the 2D barcode, and with the same means.

Figure 7:
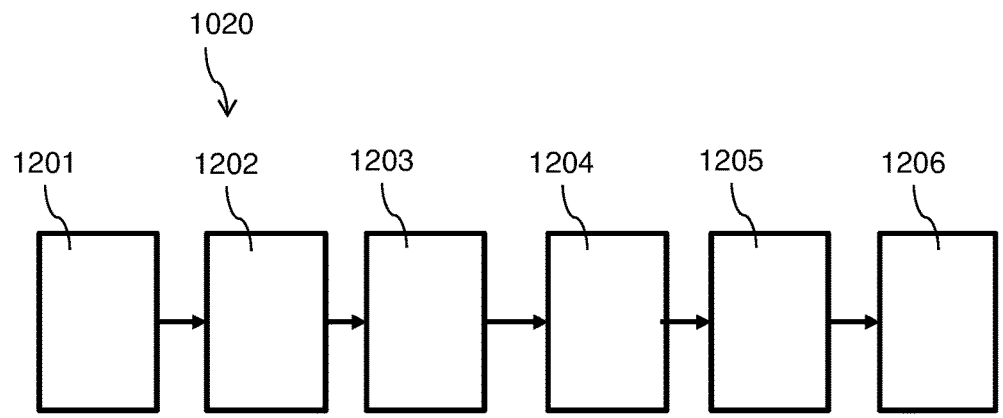
FIG. 7 represents, schematically, a first particular embodiment of a securing device that is the subject of the invention.

FIG. 7 represents a first particular embodiment of a securing device 1020 that is the subject of an aspect of the invention. The first message is a content of a visible electronic stamp representative of at least a header, a message and a signature.

The device 1020 for securing an object comprises:
- a means 1201 for constituting a content of a visible electronic stamp representative of at least a header, a message and a signature;
- a means 1202 for determining a shape of the first 2D barcode having an information storage capacity spread over at least two areas;
- a means 1203 for segmenting the content of the visible electronic stamp into at least two portions according to the storage capacity of each area, each portion being assigned to an area;
- a means 1204 for recording an item of information representative of the segmentation and assignment in order to reconstruct, on reading, the content of the visible electronic stamp;
- a means 1205 for encoding the segmented visible electronic stamp in the shape of the 2D barcode determined; and
- a means 1206 for marking the object with the encoded first 2D barcode.

Preferably, the embodiments of the device 1020 are configured to implement the steps of the method 1010 and their embodiments as described above, and the method 1010 and its different embodiments can be implemented by the embodiments of the device 20.

The means for constitution 1201, determination 1202, segmentation 1203, recording 1204 and encoding 1205 are preferably a microcontroller implementing a computer program.

The marking means 1206 can be any means known to the person skilled in the art, such as a printer or a laser for engraving the object.

Figure 8:
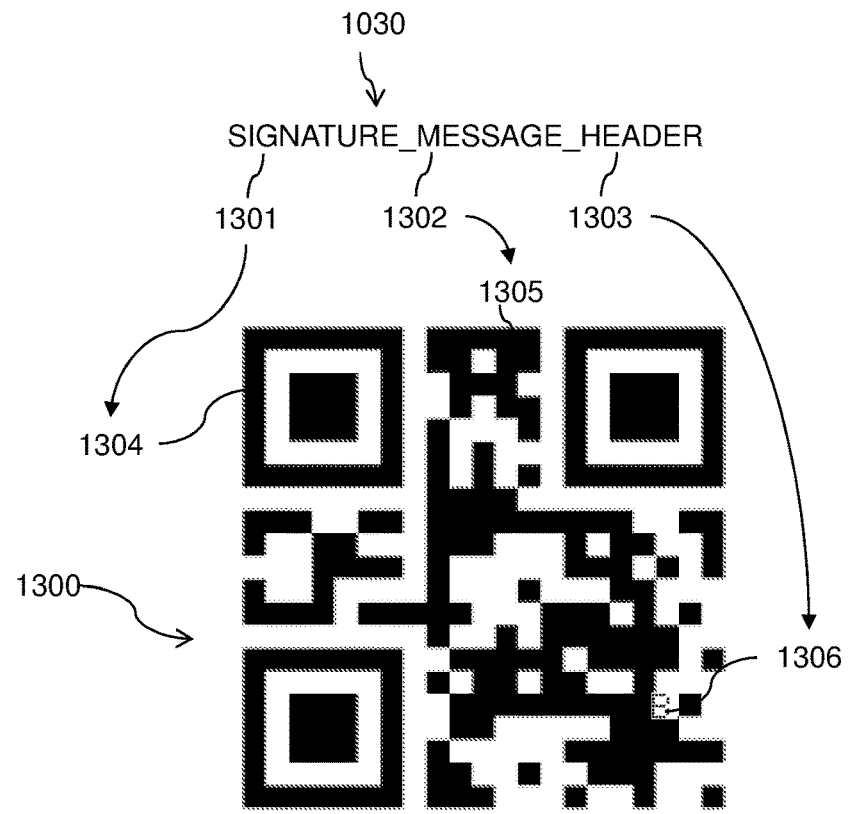
FIG. 8 represents, schematically, a first embodiment of an object secured by a method that is the subject of the invention.

FIG. 8 shows a particular embodiment of a 2D barcode obtained by a method 1010 that is the subject of an aspect of the invention.

FIG. 8 represents a content of a VES, comprising a header 1301, a message 1302 and a signature 1303.

One form of 2D barcode 1300 comprises three storage areas: an orientation element 1304, a payload space 1305 and the content of cells 1306. The cell content 1306 is represented by an uppercase letter "B", in black on a white background, replacing a white cell. The form of 2D barcode 1300 is a QR code.

In FIG. 8, the content of the header is encoded in the orientation element 1304, the message 1302 is encoded in the payload space 1305, and the signature, which does not need to be secret, is encoded in the content of cells 1306.

Figure 9:
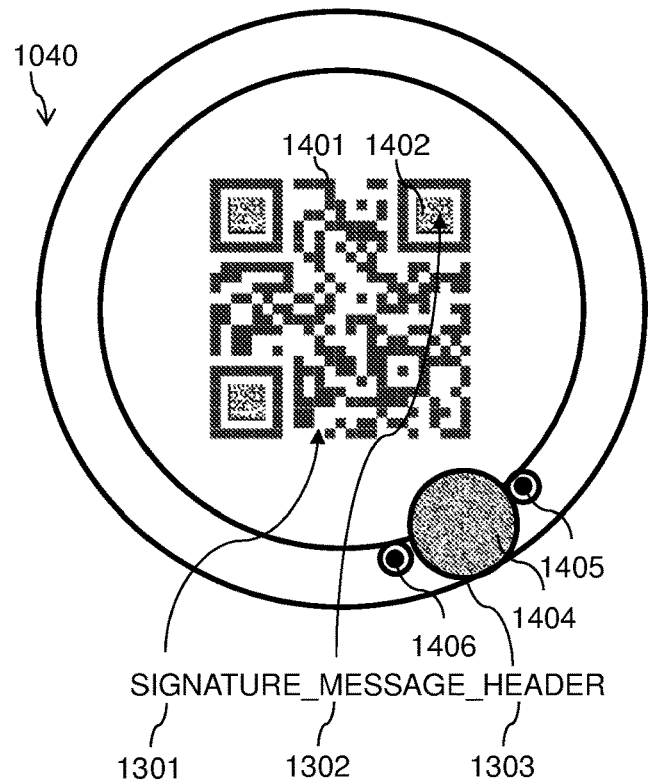
FIG. 9 represents, schematically, a second embodiment of an object secured by a method that is the subject of the invention.

FIG. 9 shows a particular embodiment of a 2D barcode obtained by a method 1010 that is the subject of an aspect of the invention.

FIG. 9 represents a content of a VES, comprising a header 1301, a message 1302 and a signature 1303.

One form of 2D barcode 1040 comprises two storage areas: an orientation element 1402 replaced by a Data Matrix code, and a payload space 1401. In some embodiments, the content of cell 403 is a third storage area. For example, an uppercase letter "B" is represented, in black on a white background, replacing a white cell. The form of 2D barcode is a QR code.

In FIG. 9, the message 1302 is encoded in the Data Matrix in the orientation element 1402, the header 1301 is encoded in the payload space 1401, and the signature, which does not need to be secret, is encoded in the content of cells 1403.

FIG. 9 also shows a fragile anti-copy mark 1404, 1405 and 1406 that encodes an element representative of the signature. The fragile anti-copy mark 1404 is a SealVector (registered trademark) for example. In some embodiments, the fragile anti-copy mark 1404, 1405 and 1406 encodes an element representative of the object and/or the segmentation and assignment information.

The SealVector (registered trademark), 1404, 1405 and 1406, comprises two orientation elements 1405 and 1406. The orientation elements are black circles surrounded by white on a black background. The SealVector comprises a circular payload space 1404. To determine the position of the SealVector and decode it, the centre of the orientation elements 1405 and 1406 is calculated, the position of the SealVector being defined in relation to the position of these centres. After the position and orientation of the SealVector, it can be decoded.

It is noted here that a SealVector is a particular fragile anti-copy mark.

Figure 12:
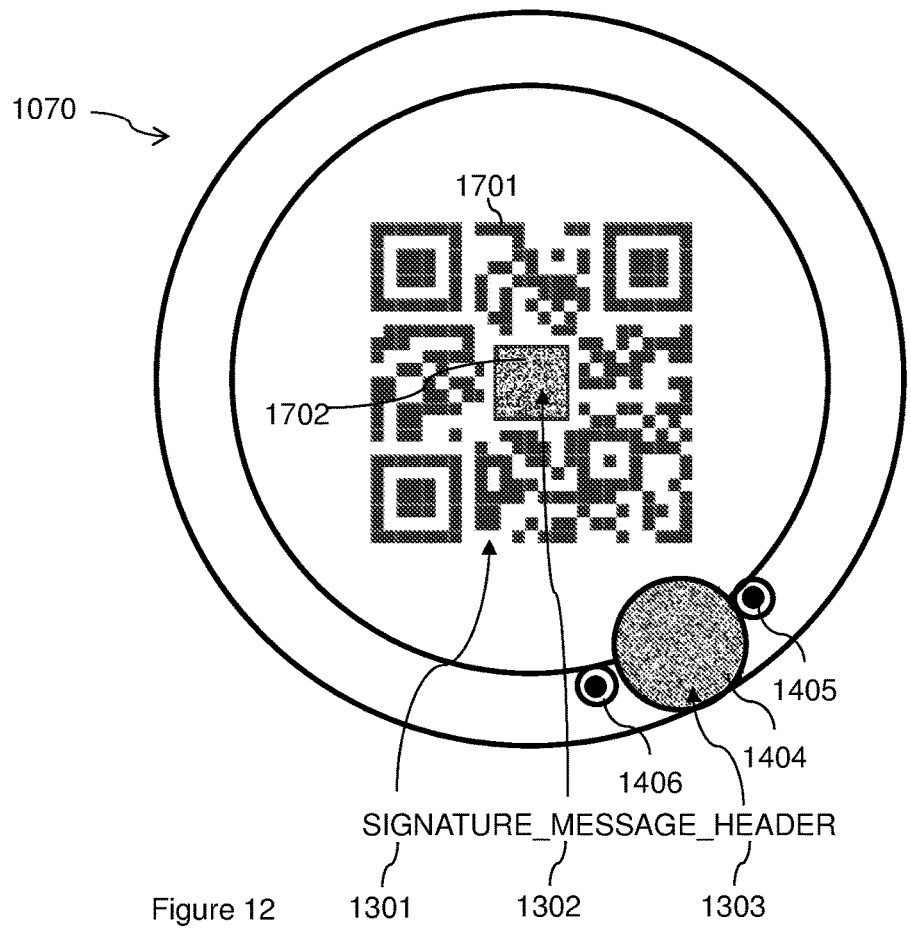
FIG. 12 represents, schematically, a third embodiment of an object secured by a method that is the subject of the invention.

In FIG. 12, the Data Matrix code is located at the centre of the 2D code, not in an array, replacing a portion of the payload space.

Figure 10:
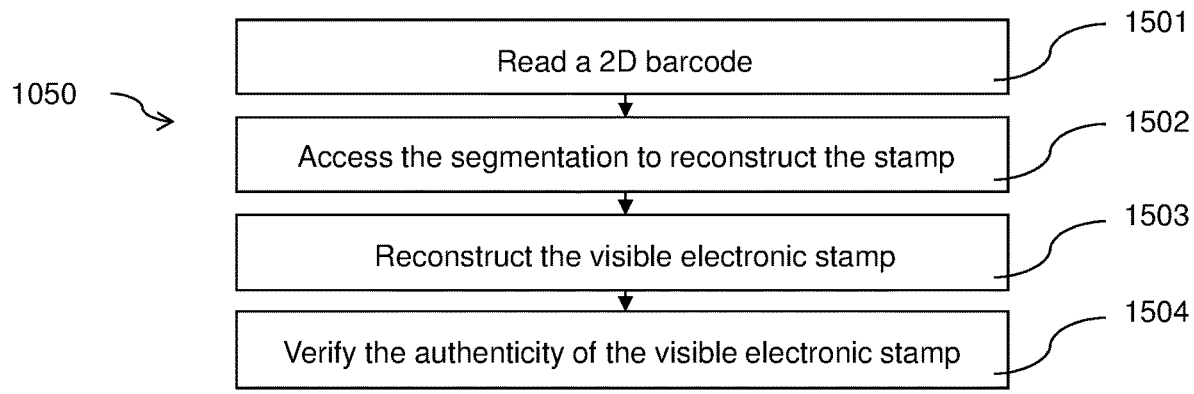
FIG. 10 represents, schematically and in the form of a logical diagram, a particular series of steps of the authentication method that is the subject of the invention.

FIG. 10 shows a schematic view of an embodiment of the authentication method 1050 that is the subject of an aspect of the invention.

The method 1050 for authenticating an object comprises:
- a step 1501 of reading a 2D barcode corresponding to the reading step 401;
- a step 1502 of accessing an item of information representative of the segmentation and assignment in order to reconstruct a content of a visible electronic stamp;
- a step 1503 of reconstituting the content of the visible electronic stamp according to the information accessed; and
- a step 1504 of verifying the authenticity of the content of the reconstituted visible electronic stamp.

During the reading step 1501, the 2D barcode is decoded by a reader 1501. The reader 1501 is, for example, a communicating mobile terminal equipped with a photo camera or camera that scans the code. The communicating mobile terminal then applies an algorithm for decoding the code. The reader 1502 accesses an item of information representative of the segmentation and assignment in order to reconstruct a content of a VES. For example, the reader 1502 accesses a remote resource, such as a secure server indicating which segment is located in which area.

In some embodiments, alphanumeric characters are represented in the cells of the 2D barcode without changing the colour detected by a reader of the 2D barcode. That is to say that a minimum quantity of dots of a predefined colour in a cell, such that the cell is detected as having this colour by a predefined reader, is complied with during the representation of the alphanumeric character.

Preferably, the alphanumeric characters represent the signature and can be read through optical character recognition.

The step 1501 of reading the fragile anti-copy mark can be carried out by the same reader as the reader carrying out the reading of the 2D barcode. During the reading step 1501, the original or copied nature of the fragile anti-copy mark is evaluated. The evaluation of the original or copied nature depends on an error rate detected during the reading of the fragile anti-copy mark. The error rate is compared against a predefined limit value that makes it possible to determine whether the fragile anti-copy mark is an original or not.

In effect, the printed fragile anti-copy mark has, as soon as it is first printed on the document, a large quantity of random errors that cause a copy, made with the same printing means as the original, of the printed identification image to comprise even more errors, the total number of errors of the copy making it possible to detect that it is a copy. The redundancies make it possible to correct printing and/or reading defects and the wear or erasure marks of the fragile anti-copy mark.

The copied nature of the fragile anti-copy mark is a first verification level of the authenticity of the object. During the step of verifying the authenticity of the object 504, the copied nature of the fragile anti-copy mark is preferably reported to a user.

During the reconstitution 1503, the contents of each area are juxtaposed in the order defined by the information accessed. The content of the VES is therefore reconstituted and its authenticity can be verified 1504 in a way known to the person skilled in the art.

Preferably, during the verification step 1504, the content of a fragile anti-copy mark read represents an element representative of the signature. During the verification step, a comparison of the representative element read in the fragile anti-copy mark and the signature read in the 2D barcode is carried out to determine the authenticity of the signature at the time of marking.

In some embodiments, during the step of reading a fragile anti-copy mark, an item of information is obtained representative of the object on which the mark has been affixed, the method also comprising a step of comparing the representative information obtained and the object.

The representative information can be a serial number, for example. The serial number of the object can be obtained through optical character recognition. In these cases, the comparison step can be carried out by character-by-character comparison. Depending on the result of the comparison, an item of information concerning the authenticity of the 2D barcode and/or the fragile anti-copy mark can be indicated to the user during the verification step 1504.

Figure 11:
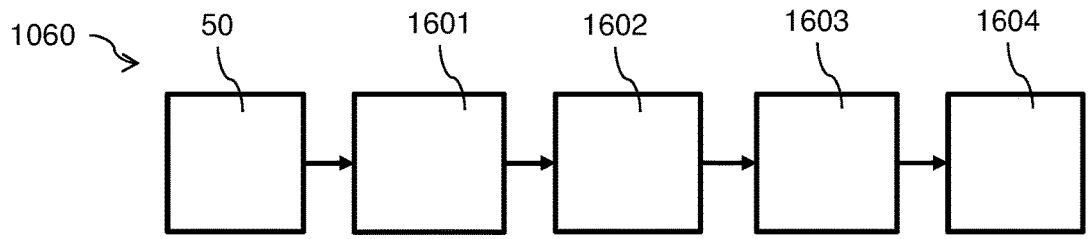
FIG. 11 represents, schematically, a first particular embodiment of an authentication device that is the subject of the invention.

FIG. 11 shows a particular embodiment of a device 60 for authenticating an object, the subject of an aspect of the invention, which device comprises:
- a means 1601 for reading a 2D barcode corresponding to the reading means 501;
- a means 1602 for accessing an item of information representative of the segmentation and assignment in order to reconstruct a content of a visible electronic stamp;
- a means 1603 for reconstituting the content of the visible electronic stamp according to the information accessed; and
- a means 1604 for verifying the authenticity of the content of the reconstituted visible electronic stamp.

The means for access 1602, reconstitution 1603 and verification 1604 are preferably a microcontroller implementing a computer program.

The reading means 1601 can be any means known to the person skilled in the art, such as a communicating mobile terminal equipped with a photo camera or camera that scans the code. The communicating mobile terminal then applies an algorithm for decoding the code.

Preferably, the embodiments of the device 1060 are configured to implement the steps of the method 1050 and their embodiments as described above, and the method 1050 and its different embodiments can be implemented by the embodiments of the device 1060.

The invention claimed is:

1. A Method for securing an object, comprising:
   a step of encoding a first message in a two-dimensional barcode, the first message comprising at least header identifying a resource of a certification and a signature produced by means of this resource;
   a step of generating a fragile anti-copy mark encoding a second message representative of the signature produced, the fragile anti-copy mark is configured for degradation during copying thereof, and said fragile anti-copy mark further includes redundancies configured such that the second message is readable, despite said degradation; and
a step of marking the object with the first 2D barcode and with the fragile anti-copy mark.

2. The method according to claim 1, wherein the second message encoded in the fragile anti-copy mark also comprises at least one item of information representative of the object on which the mark is to be affixed.

3. The method according to claim 2, which also comprises a step of determining at least one physical property of the object on which the fragile anti-copy mark is to be affixed, the second message encoded in the fragile anti-copy mark comprising an item of information representative of the physical property determined.

4. The method according to claim 2, wherein an item of information representative of the object on which the mark is to be affixed is a metric artefact or a physical unclonable function (acronym "PUF").

5. The method according to claim 1, wherein the second message representative of the signature produced is obtained at least by applying a hash function for the signature produced.

6. The method according to claim 5, wherein the second message representative of the signature produced is obtained by the calculation of a cyclic redundancy code (acronym "CRC") applied to the hash resulting from the hash function of the signature produced.

7. The method according to claim 1, wherein the first message comprises a visible electronic stamp.

8. The method according to claim 7, which comprises:
a step of determining a shape of a 2D barcode having an information storage capacity spread over at least two areas;
a step of segmenting the content of the visible electronic stamp into at least two portions according to the storage capacity of each area, each portion being assigned to an area;
a step of recording an item of information representative of the segmentation and assignment in order to reconstruct, on reading, the content of the visible electronic stamp; and
a step of encoding the segmented visible electronic stamp in the shape of the first 2D barcode determined.

9. The method according to claim 8, wherein the 2D barcode is a code comprising at least one orientation element for reading the code and a payload space, at least one orientation element for reading the code being a storage area and the payload space being another storage area.

10. The method according to claim 8, wherein the header of the visible electronic stamp comprises an item of information representative of the segmentation and assignment.

11. The method according to claim 8, which comprises:
a step of creating a fragile anti-copy mark representative of the segmentation and assignment in order to reconstruct the electronic stamp; and
a step of marking the fragile anti-copy mark on the object.

12. The method according to claim 8, which also comprises:
a step of determining a cell size of the 2D barcode, the cell size being defined by a surface containing a quantity of dots;
a step of estimating a minimum quantity of dots of a predefined colour in a cell such that the cell is detected as having this colour by a predefined reader; and
for at least one cell, a step of defining an image to be represented in the cell, the quantity of dots of the image having the colour defining the cell being greater than the estimated minimum quantity, a set of images representing the header, message and/or signature.

13. The method according to claim 8, wherein at least one portion of the 2D barcode is a high-density 2D barcode.

14. The method according to claim 8 wherein at least one portion of the orientation element for reading the code is a high-density 2D barcode.

15. A device for securing an object, comprising:
a means for encoding a first message in a 2D barcode, the first message comprising at least a header identifying a resource of a certification and a signature produced by means of this resource;
a means for generating a fragile anti-copy mark encoding a second message representative of the signature produced, the fragile anti-copy mark is configured for degradation during copying thereof, and said fragile anti-copy mark further includes redundancies configured such that the second message is readable, despite said degradation; and
a means for marking the object with the first 2D barcode and the with fragile anti-copy mark.

16. The device according to claim 15, wherein the first message comprises a visible electronic stamp, which device comprises:
a means for determining a shape of the first 2D barcode having an information storage capacity spread over at least two areas;
a means for segmenting the content of the visible electronic stamp into at least two portions according to the storage capacity of each area, each portion being assigned to an area;
a means for recording an item of information representative of the segmentation and assignment in order to reconstruct, on reading, the content of the visible electronic stamp; and
a means for encoding the segmented visible electronic stamp in the shape of the 2D barcode determined.

17. A method for authenticating an object, comprising:
a step of reading a 2D barcode to obtain a first message comprising a header identifying a resource of a certification and a signature produced by means of this resource;
a step of calculating an element representative of the hash of the signature produced and/or of the signature produced;
a step of reading a fragile anti-copy mark to obtain a second message representative of the signature produced, the fragile anti-copy mark is configured for degradation during copying thereof, and said fragile anti-copy mark further includes redundancies configured such that the second message is readable, despite said degradation;
a first step of comparing the representative element read with the representative element calculated; and
a step of indicating the authenticity of the object on the basis of the result of at least one comparison.

18. The method for authenticating an object according to claim 17, wherein the first message read comprises a visible electronic stamp, the method comprising:
a step of accessing an item of information representative of a segmentation of the first message and an assignment of segments of the first message to areas of the 2D barcode, in order to reconstruct a content of a visible electronic stamp;

a step of reconstituting the content of the visible electronic stamp according to the segmentation and assignment; and a step of verifying the authenticity of the reconstituted visible electronic stamp.

19. The method according to claim 17 wherein, during the step of reading a fragile anti-copy mark, an item of information is obtained representative of the object on which the mark has been affixed, the method also comprising a second step of comparing the representative information obtained and the object.

20. A device for authenticating an object, characterised in that it comprises:

a means for reading a 2D barcode to obtain a first message comprising a header identifying a resource of a certification and a signature produced by means of this resource;

a means for calculating an element representative of the hash of the signature produced and/or of the signature produced;

a means for reading a fragile anti-copy mark to obtain a second message representative of the signature produced, the fragile anti-copy mark is configured for degradation during copying thereof, and said fragile anti-copy mark further includes redundancies configured such that the second message is readable, despite said degradation;

a first means for comparing the representative element read with the representative element calculated; and a means for indicating the authenticity of the object on the basis of the result of at least one comparison.

\* \* \* \* \*